United States Patent
Froger et al.

[11] Patent Number: 6,089,688
[45] Date of Patent: Jul. 18, 2000

[54] METHOD AND DEVICE FOR MONITORING THE CONSUMPTION OF A PRODUCT, SUCH AS AN INK, CONTAINED IN A RESERVOIR

[75] Inventors: Marie-Helene Froger, Chateagiron; Pascal Coudray, La Chapelle des Fougeretz, both of France

[73] Assignee: Canon Kabushiki Kaisha, Tokyo, Japan

[21] Appl. No.: 09/104,267

[22] Filed: Jun. 25, 1998

[30] Foreign Application Priority Data

Jun. 27, 1997 [FR] France ................................. 97 08133

[51] Int. Cl.⁷ .......................... B41J 2/195; G03G 15/00
[52] U.S. Cl. ................................. 347/7; 399/27; 73/304 C
[58] Field of Search ........................ 399/24, 27, 30, 399/61; 347/7, 86; 73/304 C; 702/129; 324/662, 664

[56] References Cited

U.S. PATENT DOCUMENTS

| | | | |
|---|---|---|---|
| 4,788,861 | 12/1988 | Lichti | 73/304 R |
| 5,198,860 | 3/1993 | Yamanaka et al. | 399/27 |
| 5,465,619 | 11/1995 | Sotack et al. | 73/304 C |
| 5,682,184 | 10/1997 | Stephany et al. | 347/7 |
| 5,802,419 | 9/1998 | Sakurai et al. | 399/26 |
| 5,923,917 | 7/1999 | Sakurai et al. | 399/27 |
| 5,946,522 | 8/1999 | Inami | 399/27 |

FOREIGN PATENT DOCUMENTS

| | | |
|---|---|---|
| 28399 | 5/1981 | European Pat. Off. . |
| 709208 | 5/1996 | European Pat. Off. . |
| 744296 | 11/1996 | European Pat. Off. . |
| 2-169259 | 6/1990 | Japan . |
| 9-146314 | 6/1997 | Japan . |
| 10-100431 | 4/1998 | Japan . |
| 10-100447 | 4/1998 | Japan . |

*Primary Examiner*—Matthew S. Smith
*Attorney, Agent, or Firm*—Fitzpatrick, Cella, Harper & Scinto

[57] ABSTRACT

In order to monitor the consumption of a normally electrically conductive product contained in a reservoir made of electrically insulating material, a measurement procedure is defined according to which there is taken off a measurement signal in response to an excitation signal applied to a storage cavity in this reservoir, this signal being such that a characteristic, such as the voltage, of the measurement signal varies substantially with the quantity of product contained in the cavity, and with a utilisation parameter of this product. A procedure for determining this utilisation parameter and a processing procedure giving an item of information on the quantity of product remaining in the reservoir as a function not only of the said characteristic but also of the instantaneous value of the utilisation parameter, are also defined. In the field of printing, this parameter can be the density of printing of the printed pages, or the temperature.

38 Claims, 8 Drawing Sheets

METHOD AND DEVICE FOR MONITORING THE CONSUMPTION OF A PRODUCT, SUCH AS AN INK, CONTAINED IN A RESERVOIR

The invention concerns the monitoring of the consumption of a normally electrically conductive product contained in a reservoir made of electrically insulating material. It applies notably, but not exclusively, to the monitoring of the consumption of a marking product in an image forming device, for example that of an ink in a printing device.

The principal aim of monitoring the consumption of product is to be able to inform the user of the equipment including the reservoir about the residual quantity of product it has available: in that way the user can estimate in advance the moment to replace the reservoir, and secondarily the moment to obtain a replacement reservoir to do this.

This monitoring is notably useful in printing devices: it is then commonly referred to as ink level detection.

Various methods of ink level detection in devices using ink-jet technology are already known.

In particular, the document EP-A2-0 028 399 describes a method of detecting a minimum ink level in a reservoir which uses a resonating resonant circuit, the capacitance of which is formed by two metal plates between which the ink reservoir is located. This ink behaves as a dielectric whose value changes as the ink level decreases; likewise the capacitance of the resonant circuit changes with this ink level. It is indicated that this resonant circuit is calibrated so that its resonant frequency, and therefore the maximum level of voltage at its resistance, is achieved when the ink level has fallen to a predetermined minimum level, for example equal to 20%. When crossing of this threshold is detected, an optical or acoustic signal is emitted.

Detection of a given threshold of ink appears to correspond to detection of the crossing of a voltage threshold for the frequency which has been defined beforehand as being the resonant frequency for the quantity of residual ink it is being attempted to detect.

It must be noted that this method is of the all or nothing type, depending on whether the threshold has been crossed or not, and is not concerned with monitoring the quantity of ink prior to the crossing of this threshold.

In fact it must be noted that, the smaller the quantity of ink defining the capacitance, the smaller the voltage peak, in consequence of which this voltage peak is all the more difficult to detect since it corresponds to a small quantity of residual ink in the reservoir. This is doubtless one of the reasons which explains why this document provides for a minimum threshold as high as 20%.

Moreover, the crossing of the voltage threshold by the electrical signal which is detected appeared to correspond to quite scattered values of the quantity of residual ink actually available in the reservoir. This is doubtless another reason why the manufacturers of printing equipment choose substantial safety margins in their indications of a "zero" level of residual ink which is supposed to lead the user to replace the reservoir.

One consequence of the choice of so high a safety margin is that, in order to guarantee that the user will not be prematurely short of ink, the reservoir is discarded while there is sometimes still an appreciable quantity of useable ink remaining.

The same situation is found more generally in relation to reservoirs containing a marking product, whether ink or not, and more generally in relation to reservoirs made of an electrically insulating material containing a product which is electrically conductive, and therefore able to be integrated into a capacitive arrangement.

The object of the invention is to overcome the aforementioned drawbacks by allowing continuous monitoring of the consumption of a product contained in a reservoir, combined with an improved accuracy as regards detection of the moment when the residual quantity of this product crosses a minimum threshold, with the consequence of allowing, with complete security for the user, a lowering of this threshold and therefore a fuller use of the product contained in the reservoir before the latter is discarded. The invention aims to achieve this object without a modification of the reservoir being necessary (such a modification is of course possible while remaining within the scope of the invention).

The invention stems notably from the assumption that the uncertainty concerning the quantity of available ink actually remaining in the reservoir is not completely erratic and in reality covers differences in the conditions under which the ink initially contained in the reservoir has been consumed, and that it is possible to take account of this in order to improve the accuracy of the measurements. Two utilisation parameters have thus been identified as having a quantifiable influence on the correlation existing between the ink quantity and the voltage, or any other characteristic, of the electrical signal measured by integrating the reservoir into a capacitive arrangement: the density of use of the ink or marking product in question, and the temperature of use.

This has been found in particular with regard to ink reservoirs of the porous body type, such as the one for example described in the document U.S. Pat. No. 5,477,963: different correlations have thus been established for different pairs of these parameters and, as these differences have appeared to vary unequivocally with variations in these parameters, it has been possible to establish correction procedures for taking account of these parameters.

Without this being a certainty, it can be assumed that, at low temperature, or at a very high printing speed, as occurs each time a physical phenomenon takes place outside its optimum equilibrium conditions, printing takes place with mediocre yield, perhaps related to a trapping of ink in the reservoir in a form in which it is no longer available.

The invention thus proposes a method for monitoring the consumption of an electrically conductive product contained in a reservoir made of plastic material having a storage cavity connected to a product outlet channel, according to which a measurement procedure is defined, including an excitation step consisting of applying an electrical excitation signal to this cavity, a capture step consisting of taking off a measurement signal, this electrical excitation signal being chosen so that this measurement signal has a characteristic varying substantially with the quantity of product contained in this cavity and with a utilisation parameter for this product, and an identification step consisting of identifying a measured value of this characteristic of the measurement signal;

a procedure is defined for determining the instantaneous value of this utilisation parameter;

a processing procedure is defined, including a conversion step consisting of deriving the value of an item of information representing the quantity of product available in the reservoir from the measured value of the said characteristic as a function of the instantaneous value of the utilisation parameter; and at least one measurement cycle is effected, including steps consisting of:

triggering the measurement procedure and capturing the measured value of the characteristic, triggering the determination procedure and capturing the instantaneous value of the utilisation paramater, triggering the conversion step from this measured value and this instantaneous value, and capturing the instantaneous value of the item of information.

Preferably, the reservoir is integrated into a capacitive arrangement to which the excitation signal is applied, and the characteristic is advantageously the amplitude of the voltage of the measurement signal. The excitation signal is preferably an alternating signal, but can as a variant be a square wave signal, or have pulses, etc.

Naturally the conversion step can consist of deriving the required information from a table giving this information from the data consisting of the measured value of the characteristic and the instantaneous value of the utilisation parameter. However, preferably, this conversion involves a compensation which is applied to the measured value before deriving therefrom, from a look-up table established for a single value of the utilisation parameter, the value of the required information item. This has notably the advantage of reducing the space necessary in memory for storing the conversion step.

Thus, preferably:

the processing procedure also includes steps consisting of defining, for a principal reference value of the utilisation parameter, a table of correspondence between the value of the characteristic and the said information item representing the quantity of product available;

establishing, for at least one first ancillary reference value of the utilisation parameter, a correction law defining a compensation to be made to the measured value of the said characteristic in the case of use of this product with this ancillary reference value of the utilisation parameter; and the conversion step of this processing procedure includes steps consisting of:

comparing the instantaneous value of the utilisation parameter with the reference values;

deriving a processed value of the characteristic which, where this instantaneous value of the parameter is substantially equal to the principal reference value, is taken to be equal to the measured value of this characteristic or, where this instantaneous value of the parameter is substantially equal to the first ancillary reference value, is defined by applying to the measured value the said correction law corresponding to this ancillary reference value; and identifying the instantaneous value of the information given by the table of correspondence for this processed value of the characteristic.

With a single ancillary reference value, it can be useful to provide a choice procedure for choosing to which of the reference values the instantaneous value of the utilisation parameter is the closest.

This is why it may be preferred to choose a plurality of ancillary reference values. Thus:

the processing procedure also includes steps consisting of:

defining, for a principal reference value of the utilisation parameter, a table of correspondence between the value of the characteristic and the said information representing the quantity of product available;

establishing, for each of a plurality of ancillary reference values of the utilisation parameter, a correction law defining a compensation to be made to the measured value of the said characteristic in the case of use of this product with this ancillary reference value of the utilisation parameter; and the conversion step of this processing procedure includes steps consisting of:

comparing the instantaneous value of the utilisation parameter with the principal and ancillary reference values;

deriving a processed value of the characteristic which, where this instantaneous value of the parameter is substantially equal to the principal reference value, is taken to be equal to the measured value of this characteristic or, where this instantaneous value of the parameter is substantially equal to one of the ancillary reference values, is defined by applying to the measured value the said correction law corresponding to this ancillary reference value; and identifying the instantaneous value of the information given by the table of correspondence for this processed value of the characteristic.

Whatever the number of ancillary reference values chosen, it may be useful, for better accuracy, to develop an interpolation law for cases, frequent in practice, where the instantaneous value of the parameter is not equal to any of the reference values: for example an interpolation of the linear type is made between the correction laws corresponding to the two reference values between which the instantaneous value of the utilisation parameter is situated.

Certain utilisation parameters can be detected by means of specific sensors; this can be the case of the operating temperature.

Amongst the utilisation parameters which it has seemed useful to monitor, there is the flow rate at which the product leaves the reservoir. Where the reservoir is designed to be integrated into an image formation device, this flow rate can be measured by the quantity of product which flows during the formation of an image; and, in the case of a printing device, this flow rate can be measured by the quantity of ink consumed during the printing of a page.

This measurement of the quantity of product consumed can be made by any means. However, it can be derived from the difference between the values of the characteristic measured at two distinct instants. Having regard to what has just been indicated with regard to cases of image formation or printing, these two distinct instants are for example chosen before and after the formation of an image or the printing of a page (this amounts quite simply to making measurements after each image, or each page, and comparing two successive values thus measured).

Preferably it is chosen to represent the correlation between the measured value of the characteristic and the information sought by means of a linear relationship. Such a simplification is generally entirely acceptable, since what counts above all is being precise at the end of the life of the reservoir. The correction law associated with each ancillary reference value can then quite simply consist of subtracting, from the measured value of the characteristic, a correction term proportional to the measured value of the flow-rate quantity and to the difference in slopes between the linear relationships relating to this ancillary reference value and to the principal reference value.

For implementing the aforementioned method, the invention also proposes a device for monitoring the consumption of an electrically conductive product contained in a reservoir made of plastic and having a storage cavity connected to a product outlet channel, having:

first means of applying an electrical excitation signal to this cavity, and second means for taking off a measurement signal, this electrical excitation signal being chosen so that this measurement signal has a characteristic varying substantially with the quantity of product contained in this cavity and with a utilisation parameter for this product;

determination means for determining the instantaneous value of this utilisation parameter; and logic processing means connected to the first and second means and to the determination means and designed so as to:
- control the first and second means and capture a measured value of the said characteristic of the measurement signal;
- capture the instantaneous value of the utilisation parameter; and
- derive the value of an item of information representing the quantity of product available in the reservoir from the measured value of the said characteristic as a function of the instantaneous value of the utilisation parameter.

This device preferably has means adapted to implement the preferred provisions indicated above with regard to the method. This usually corresponds to an appropriate arrangement of the logic processing means, which will be designed so as to implement these preferred provisions.

In particular, the logic processing means are notably advantageously designed so as to detect themselves the utilisation parameter, in the form of a quantity representing the flow rate at which the product flows out of the reservoir, from the values of the characteristic of the measurement signal measured at different instants.

The invention also concerns:
- a machine supplying product having a consumption monitoring device of the aforementioned type, with as a particular case an image formation device such as a printing appliance; and
- an office machine having an ink reservoir and a device for monitoring the consumption of this ink of the aforementioned type.

Objects, characteristics and advantages of the invention emerge from the description which follows, given by way of a non-limitative illustrative example with reference to the accompanying drawings in which.

Figure 1:
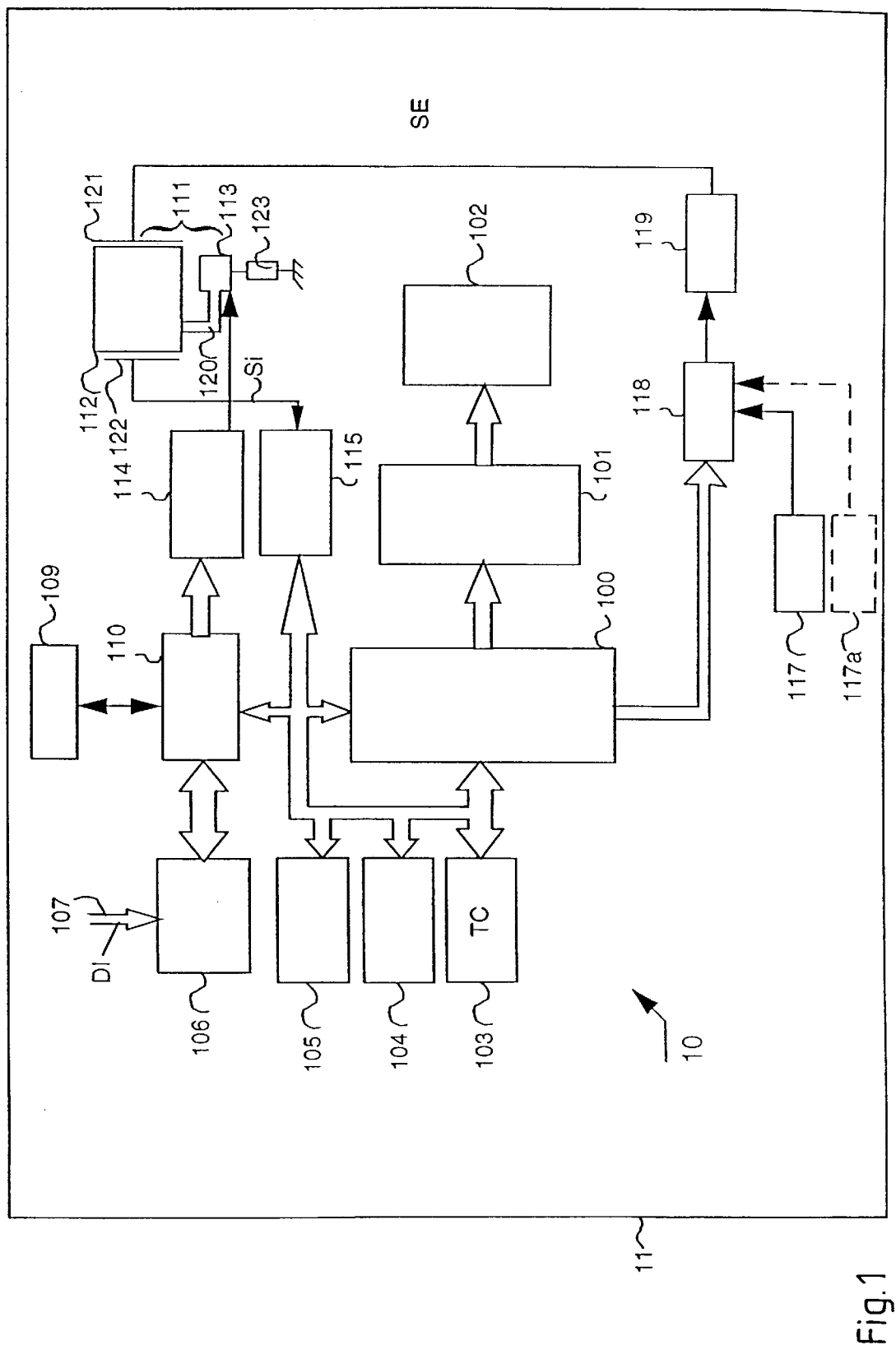
FIG. 1 is a block diagram of a printing device in accordance with the invention.

In general terms, the invention uses two metal plates on each side of an electrically insulating reservoir (for example made from plastic) containing a conductive ink, or any other conductor whose consumption is to be monitored, the whole forming a capacitor; preferably the duct connecting the reservoir to the print head is used as an electrical switch between the said reservoir and the equivalent impedance between the said print head and earth.

The reservoir made of insulating material, containing the ink, behaves as a dielectric in the capacitive arrangement formed by these two plates with the reservoir and its outlet channel.

The ink behaves as an electrical conductor between the reservoir and the impedance of the print head.

The invention preferably consists of generating a sinusoidal signal on one of the plates and taking off the voltage at the other plate, this voltage representing both the quantity of ink contained in the reservoir and, preferably, the presence of ink in the duct connecting the said reservoir and the said print head.

The invention is described in relation to an image transfer device, for example included in a printer 10, which receives data to be printed DI by means of an input/output port 107 connected to an interface circuit 106. The circuit 106 is connected to an ink ejection control circuit 110 which controls an ink cartridge 111, via an amplification circuit 114.

The ink cartridge 111 is exchangeable and is mounted on a carriage with reciprocating translational motion driven by a motor 102.

The ink cartridge comprises essentially an ink reservoir 112, and a duct 120 connecting the reservoir and the print head 113. This print head 113 creates an impedance between the ink and earth.

The printer also has a main data processing circuit 100, associated with a read-only memory 103 and a random access memory 109. The read-only memory 103 contains the operating programs for the main processing circuit 100, while the random access memory 109, also associated with the ink ejection control circuit 110, temporarily stores the data DI received by means of the interface 106 as well as the data processed by the main processing circuit 100.

The main processing circuit 100 is connected to a display 104 on which the main processing circuit 100 controls the display of messages representing the operation of the printer. The main circuit 100 is connected to a keypad 105 having at least one switch by means of which the user can transmit operating commands to the printer.

The processing circuit 100 is also connected to the motor 102 by means of an amplification circuit 101. The motor 102 provides the movement of the carriage which carries the print cartridge 111. The motor 102 is for example a stepping motor. The printer described previously is conventional and well known to persons skilled in the art. It will therefore not be detailed further.

Thus, according to the invention, the printer has two metallic plates 122 and 121 fixed at the outside of the reservoir. A plastic reservoir containing conductive ink, the whole making a capacitor.

The printer comprises a means for supplying the metallic element 121 with an alternating signal supplied by an oscillator 117 with a high frequency, for example 20 MHz, or by an oscillator 117a with a low frequency, for example 10 kHz, via a selector 118 and an amplifier 119.

The printer also comprises a means 115 for converting the electrical signal between the metallic receiving element 122 and earth into a signal representing the ink level and/or the presence of ink in the connecting duct 120. The presence or absence of ink in this duct connects or does not connect the ink contained in the reservoir to earth by means of the impedance existing between the ink in the print head and the said earth.

The main processing circuit 100 is connected to the switch 118 to control it and thus enable transmission of the alternating signal between the oscillator 117 and the metallic element 121 constituting one of the faces of the capacitor.

The metallic receiving element 122 is connected to a conversion circuit 115, itself connected to the main processing circuit 100. This metallic receiving element 122 constituting the second face of the capacitor with the cartridge as dielectric.

The metallic receiving element 122 is connected to the conversion circuit 115, which in response supplies a digital signal SN to the main processing circuit 100.

Figure 2:
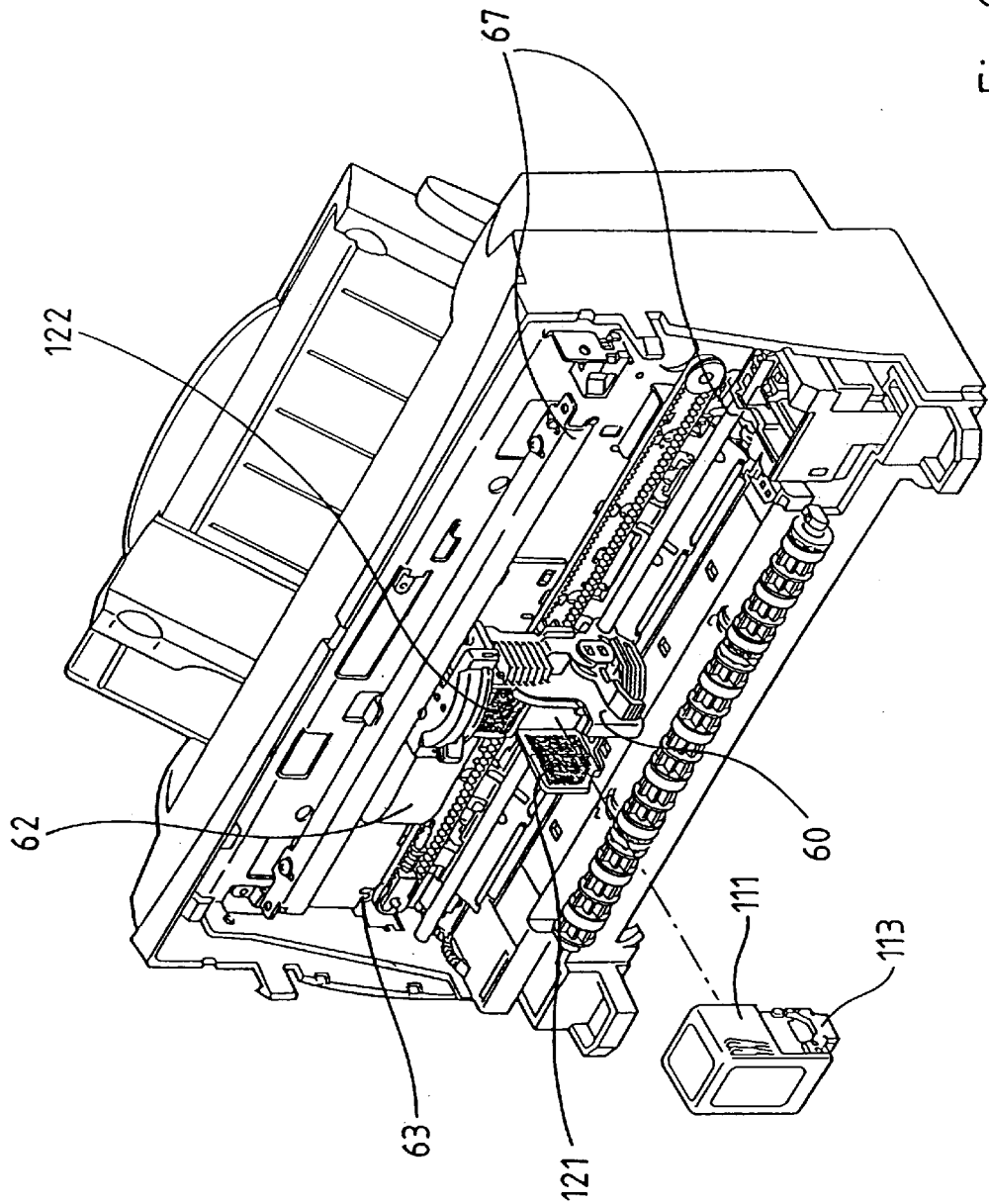
FIG. 2 is a simplified perspective view of this printing device.

The printing device conventionally comprises, as is clear from FIG. 2, a carriage 60 for carrying the print cartridge 111. The carriage is driven in a reciprocating movement on a movement path formed by guide rails 67. The motor drives the carriage 60 by means of a belt device 63.

The movement path of the print head 113 is parallel to a line on a print medium, not depicted, such as a sheet of paper. A flexible cable 62 connects the amplification circuit 114 to the cartridge 111, the amplifier 119 to the metallic element 121 and the element 122 to the detection circuit 115.

Figure 3:
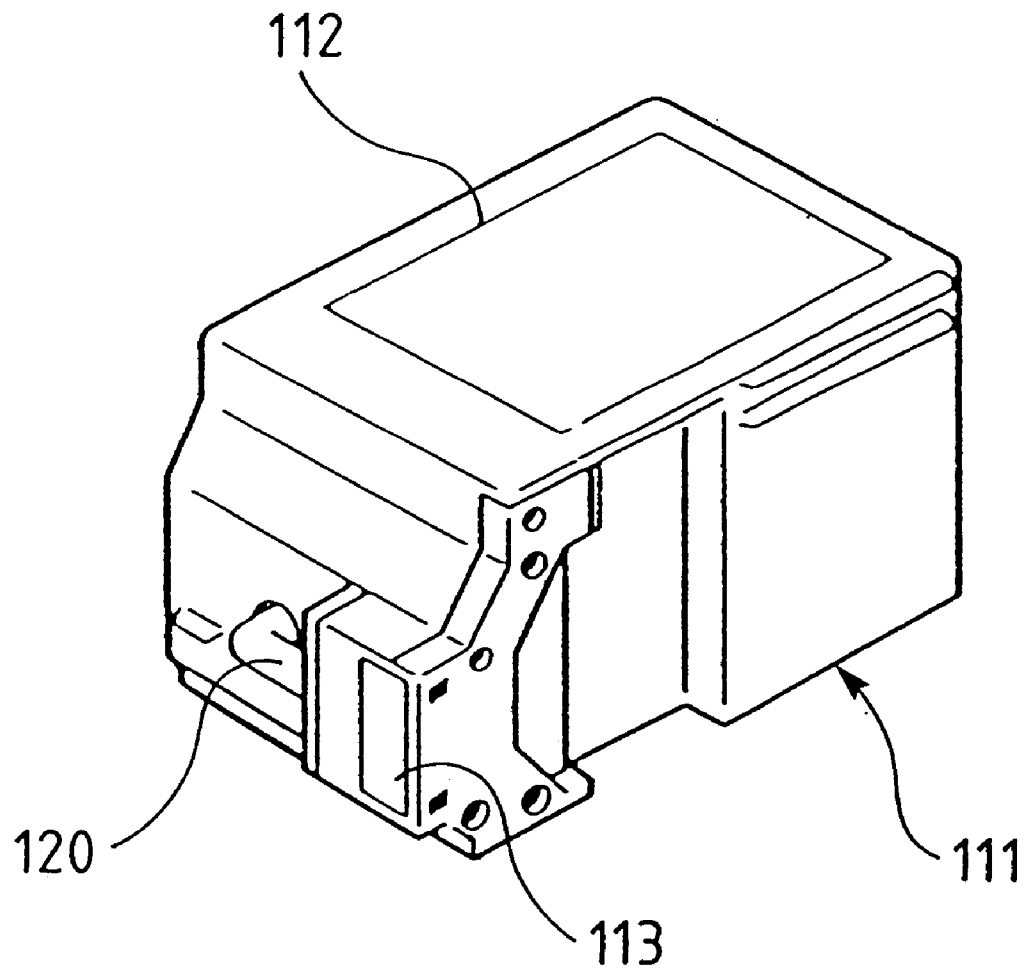
FIG. 3 is a schematic perspective view of a reservoir of this printing device.

FIG. 3 is a view of the ink cartridge 111. The reservoir part 112, the connecting duct 120 connecting the said reservoir to the print head and finally the print head 113 can be seen.

Figure 4:
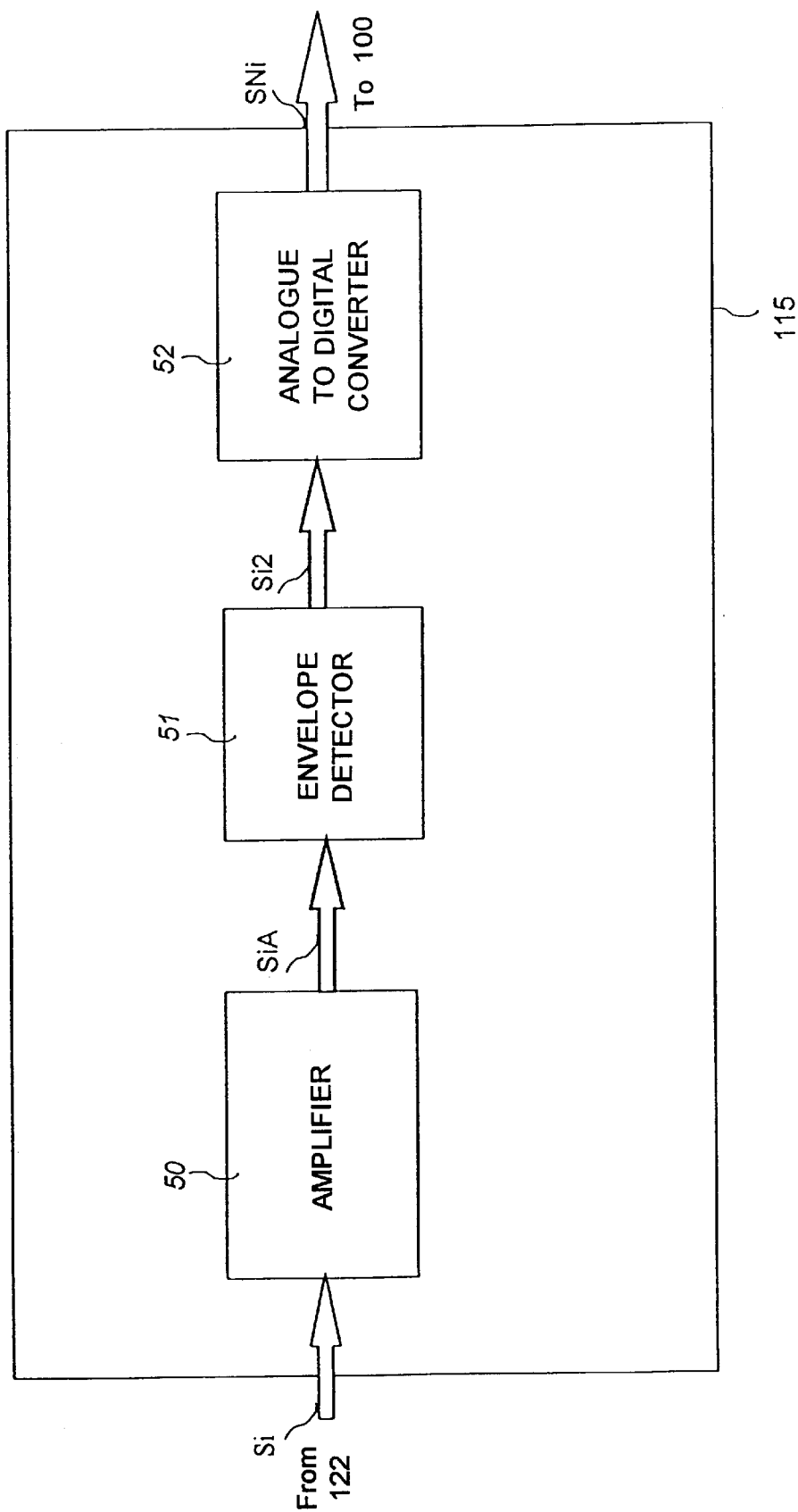
FIG. 4 is a block diagram of the device for determining the voltage of the measurement signal of this printing device.

The conversion circuit in FIG. 4 extracts the amplitude of the signal received by the metal plate 122 in response to the excitation signal SE. The conversion circuit 115 comprises an amplifier 50 with an input impedance of 1MΩ connected to an envelope detector 51. The envelope detector 51 is connected to an analogue to digital converter 52 connected to the processing circuit 100.

The metal element 122 supplies the electrical signal Si to the amplifier 50, which amplifies the electrical signal Si with respect to current and voltage so as to facilitate the following processing. The electrical signal Si is a function of the capacitance detected between the two metal elements.

The amplifier 50 supplies the amplified signal SiA to the envelope detector 51, which determines the peak value of the amplified signal.

The signal Si2 at the output of the envelope detector 51 is supplied to the converter 52. The converter 52 converts the analogue signal Si2 into a digital signal SNi in order to transmit it to the processing circuit 100. A mapping table TC stored in memory 103 respectively maps a quantity of ink, for example expressed as a percentage of a maximum quantity, to the digital signal SN supplied by the converter 52.

Figure 5:
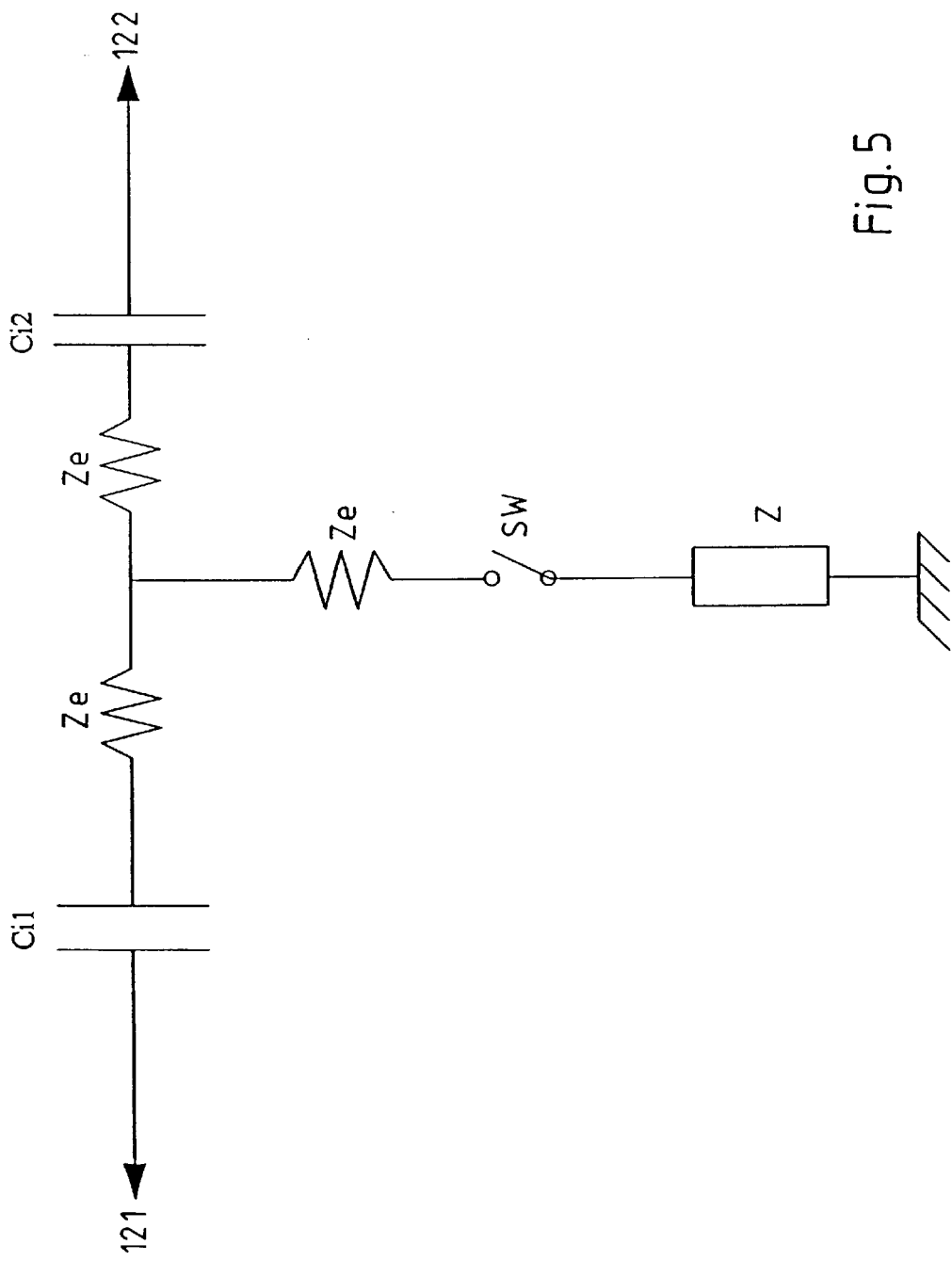
FIG. 5 is an equivalent electrical diagram of the capacitive arrangement of which the reservoir of this printing device forms part.

FIG. 5 depicts the equivalent electrical diagram of the phenomenon:

Ci1: represents the capacitance constituted by the metallic element 121, the wall of the reservoir 112 and the ink.

Ze: represents the equivalent impedance of the ink, which may be both resistive and capacitive.

Ci2: represents the capacitance constituted by the metallic element 122, the wall of the reservoir 112 and the ink.

Sw: represents the ink present or absent in the duct 120. This is represented in the form of a switch which is open or closed depending on the absence or presence of ink.

Z: represents the impedance between the ink contained in the print head and the system earth.

The oscillator 117 is connected to the element 121 and, when the quantity of ink decreases, the capacitances Ci1 and Ci2 decrease, the impedance Ze increases substantially and the voltage at 122 decreases. With the oscillator 117a, when there is no ink in the duct, the latter serves as a switch, then causing an abrupt rise of the electrical signal on the element 122.

Figure 6:
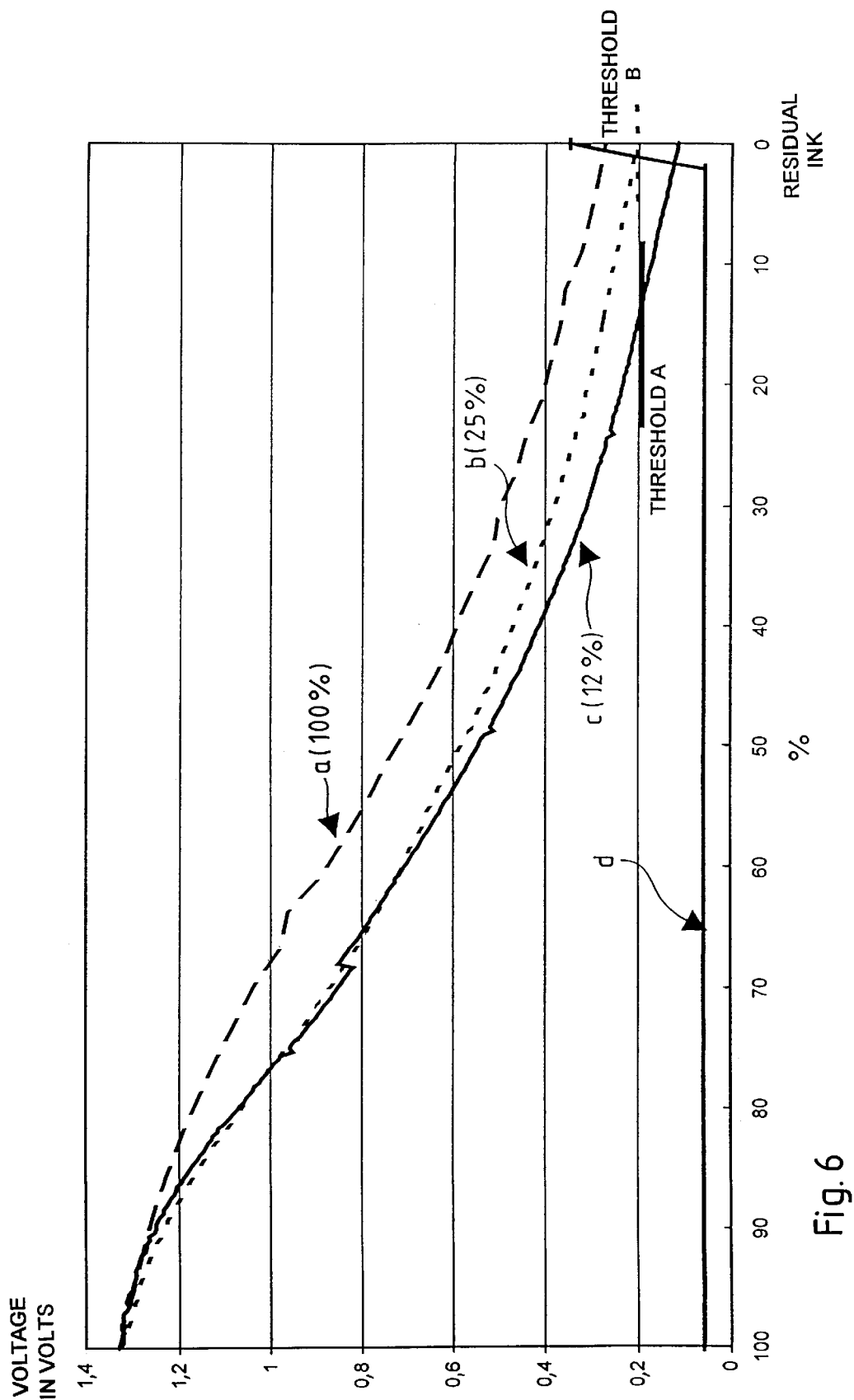
FIG. 6 is a graph showing various curves corresponding to various print densities.

FIG. 6 depicts experimental curves showing the results obtained by the invention.

On the X-axis the quantity of ink contained in the reservoir is expressed as a percentage of the maximium quantity. The voltage of the electrical signal Si, expressed in volts at the metal element 122, on the Y-axis. Four curves are shown here.

The curve d is obtained by using the oscillator 117a, whose frequency is around 10 kHz. At this frequency, the impedance of the print head is of low value, which tends to reduce the influence of the variation in the ink level on the signal Si. The abrupt change corresponds here to the absence of ink in the duct.

Curves a, b and c are obtained by using the oscillator 117, whose frequency is around 20 MHz. Curve a corresponds to an intensive use of ink, the printed pages are then almost entirely black (100%). Curve b corresponds to a reduced use of ink (25%) compared with the previous one. Curve c corresponds to an even smaller use (12%), this curve will be taken as a reference for assessing the level of ink in the cartridge. At the threshold A, a change of oscillator is provided for in order to determine the total absence of ink. This threshold A corresponds to a quantity of ink of around 15%.

The threshold B, for its part, corresponds to the decision threshold for curve d and makes it possible to know exactly when there is no more ink.

The differences in behaviour of the curves corresponds to a difference in distribution of ink in the cartridge consisting of a porous body.

Figure 7:
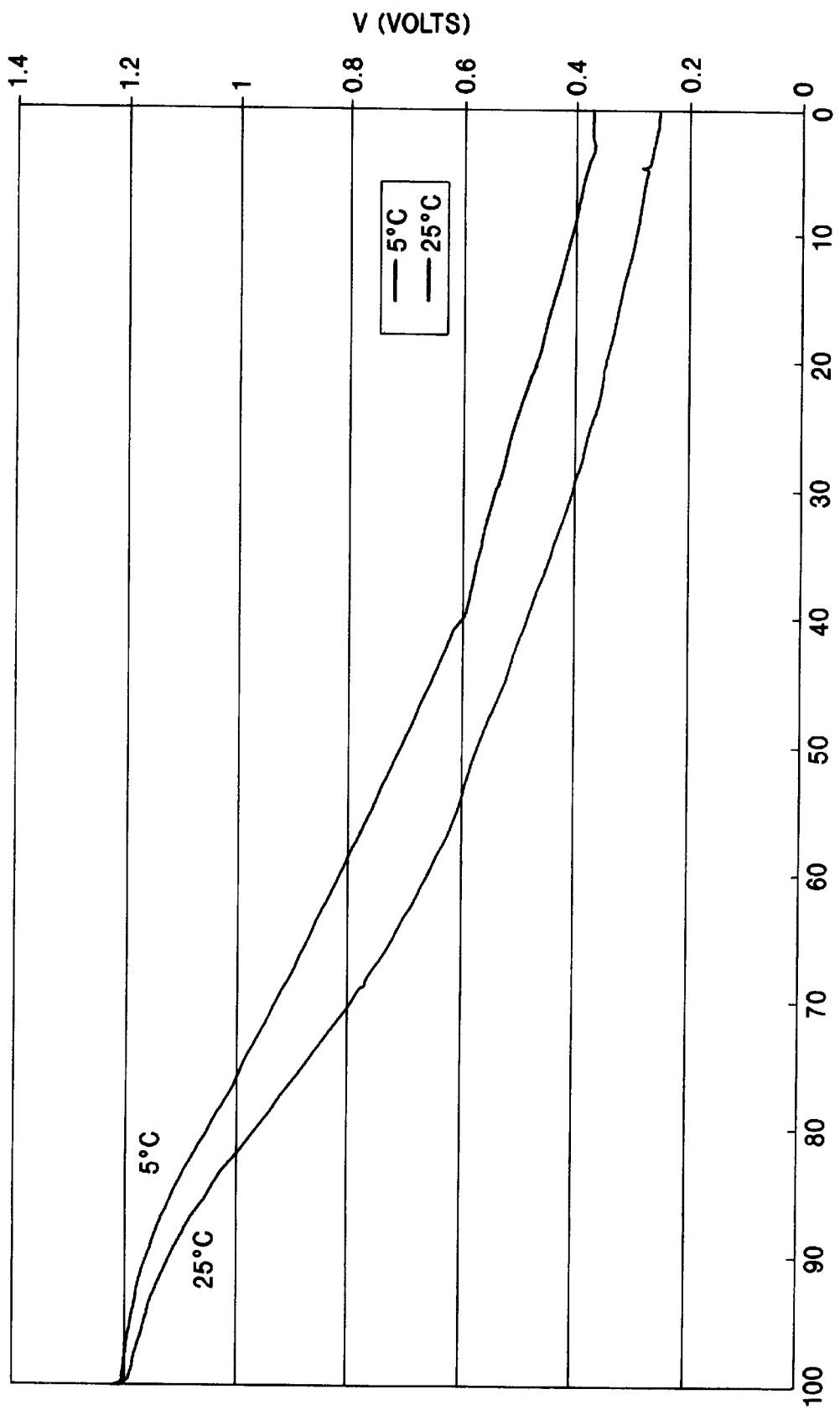
FIG. 7 is a graph showing two curves corresponding to two operating temperatures of the printing device.

FIG. 7 is a graph showing the correlation between the amplitude of the voltage and the quantity of ink available, obtained by complete consumption of the ink in the reservoirs, for two operating temperatures, namely 5° C. and 25° C.

It may be noted that these two curves are separate, the curve at 5° C. being situated higher than the curve at 25° C.: for a given value of the amplitude of the voltage, the residual quantity of ink is therefore overestimated, if a value of the characteristic measured at low temperature is converted using the correlation law obtained for the "normal " temperature of 25° C.

In both cases in FIGS. 6 and 7, it is possible to use only one correlation law, for a principal reference value of the utilisation parameter, and to carry out a correction as a function of data obtained for ancillary reference values of this parameter.

A simple way of proceeding consists first of all of assimilating each curve to a straight line.

Thus, with regard to FIG. 6, where the amplitude of the voltage is equal, at "zero" ink, to:

0.274 mV after 33 pages in the case of 100% printing (black page), that is to say at the maximum possible flow of ink;

0.208 mV after 159 pages in the case of 25% printing, that is to say for a moderate flow of ink;

0.115 mV in the case of 12%, printing, that is to say for a small flow of ink.

It will be noted that the difference in voltage amplitude at "Zero" ink is equal to:

159 mV between 100% and 12%, i.e. 4.8 mV per page;

93 mV between 25% and 12%, i.e. 0.585 mV per page.

It can thus be predicted that, according to the variation in temperature found during the formation of a page, an estimation of the rate of use of ink will be deducted, and there will be applied, to the measured value of the amplitude of the voltage, by subtraction, a correction factor proportional to this rate and to the difference in slope in the linear equations corresponding respectively to the ancillary reference value which is most closely approached by that which is indicated by the flow rate measurement and to the principal reference value (here 12%).

The concept of flow rate corresponds here to the fraction of 100% of ink utilisable which is consumed per page: at 100% this flow rate is 1/33. As for the difference in slope, because the X-axis varies from 0 to 1 (from 0% to 100% ink consumed), it is given by the difference in voltages at "zero" ink: it is 159 mV for 100% printing, and the correction term is 159/33, that is to say 4,8 mV.

Thus, if for example, after the printing of one page, a reduction is detected in the voltage amplitude of 32 mV, (this corresponds to the reduction in voltage amplitude when printing a page at 100%), a correction term equal to 4.8 mV is applied.

The corresponding correction term is 0.585 mV when the voltage variation during the printing of a page corresponds to 25% density.

Figure 8:
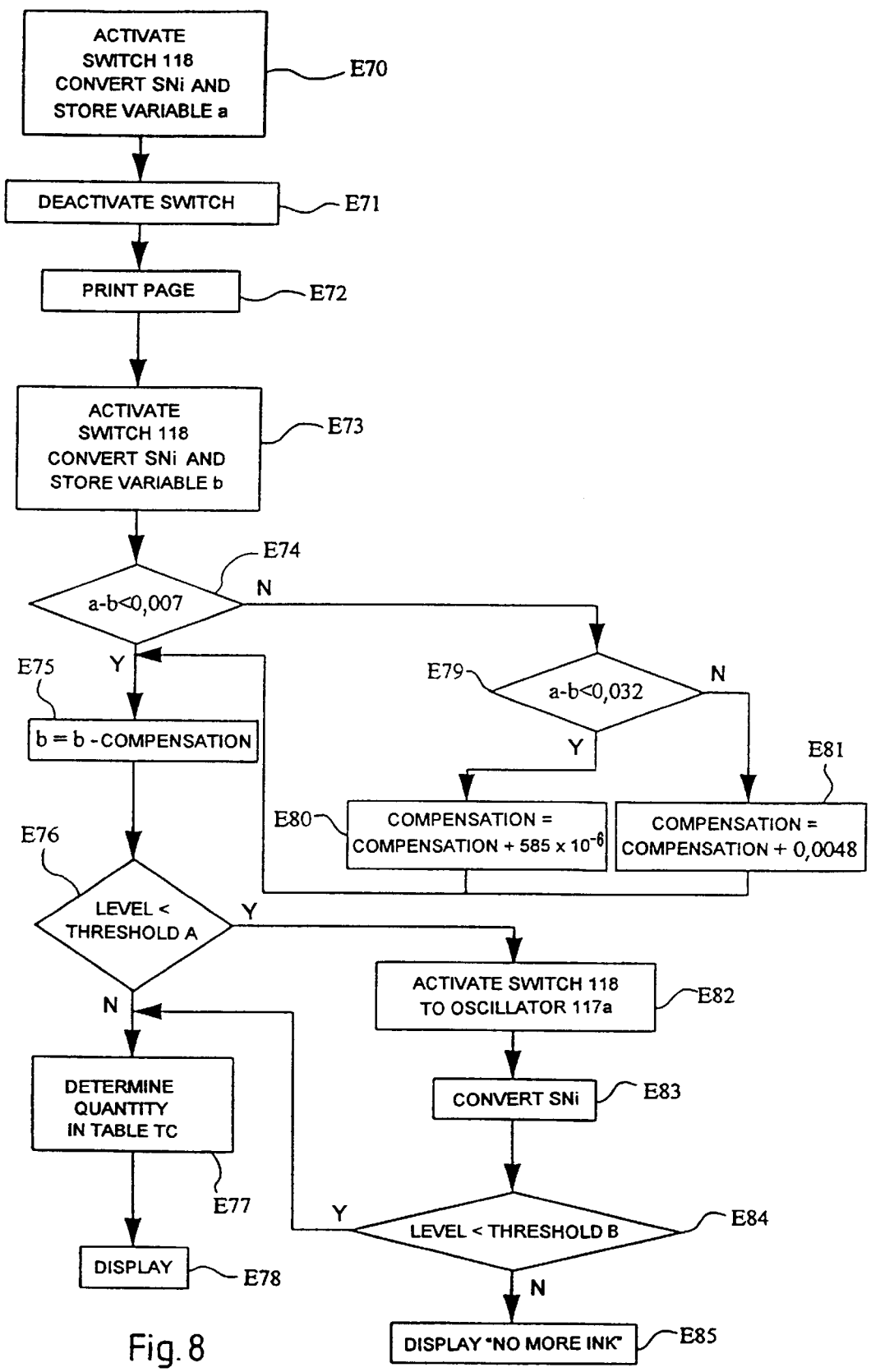
FIG. 8 is a flow diagram of the program monitoring the consumption of the printing device.

The flow diagram in FIG. 8 corresponds to the processing which has just been defined, choosing to apply one or other of the correction laws, depending on whether the instantaneous value of the utilisation parameter (here the variation in voltage per page) is greater than one or other of these thresholds of 32 mV or 0.585 mV.

This flow diagram corresponds to an algorithm stored in the read only memory 103 of the printing device. The algorithm comprises 16 steps E70 to E85, which are run through at each printing of a page. The algorithm determines the quantity of ink in the reservoir 112.

Step E70 consists of positioning the switch 118 to enable the signal generated by the oscillator 117 to pass to the amplifier 119 so that the metal element 121 is fed by the signal SE. The signal Si is converted into digital information. This information is stored in the RAM under the variable a. The Central Unit will next, at step E71, deactivate the switch 118 and be able to carry out the printing of a page at step E72. Once this operation has been performed, the device will at E73 activate the switch 118 and covert the signal Si into an information item SNi. This information item SNi is stored in RAM under the variable b.

It should be noted that the difference between a and b makes it possible to know the quantity of ink used and to determine what type of page has been printed: less than 25% of the page is black or close to 100%.

This identification is made at steps E74 and E79.

At step E74, it is checked whether a-b<0.007, that is to say 7 mV. In the affirmative the Central Unit goes to step E75. This corresponds to the printing of a page of low density and therefore no correction is to be made.

This small difference explains the need to carry out a measurement just before printing and just after so as to eliminate any drifts other than those due to ink variations.

At step E75, the compensation variable will be subtracted from the variable b. When a new cartridge is changed, this compensation variable is set to 0.

This variable will be kept in memory throughout the period of use of the cartridge.

The following step E76 consists of checking whether b is less than a predetermined threshold A, for example 200 mV. In the negative, the Central Unit will determine the quantity of ink in the table TC at E71 and display the result at E78.

Where the test at E76 is affirmative, this corresponds to a quantity of ink less than 15%. The Central Unit will activate the switch 118 to the oscillator 117a at E82.

At E83 the signal is converted and is compared with a predetermined threshold B at E84. In the affirmative the Central Unit goes to E77, in the negative to E85 and informs that there is no more ink. For example, the compensation variable can be erased, reset to 0 at this moment so as to be ready for the fitting of a new cartridge.

If test E74 is negative, the Central Unit switches to step E79. This corresponds to an intensive use of ink for page printing, and therefore the need to effect a correction.

Step E79 consists of checking whether a-b<0.032, that is to say whether the page is almost black. The affirmative enables the Central Unit to go to to E80 and to modify the compensation variable by increasing it by $585 \times 10^{-6}$. In the negative, the Central Unit will increase the compensation by 0.0048 at E81.

It should be noted that newly modified compensation will be used as a variable for the next page. In addition, in our example, two decision thresholds have been made, but it is entirely envisageable that the number of tests can be increased and therefore the correction refined.

When this has been carried out, the Central Unit goes to E77, the Central Unit will determine the quantity of ink remaining in the reservoir by virtue of the table TC stored in ROM and display the result.

Naturally, the above description is offered only for illustrative purposes. Thus, notably, it is possible to choose any number of ancilary reference values. In addition, there can be an interpolation, for example linear, between the correction laws when the instantaneous value of the utilisation parameter is between two reference values (in this case, the "correction" for the principal reference value is nil).

We claim:

1. Method of monitoring the consumption of a product which is normally electrically conductive contained in a reservoir made of electrically insulating material having a storage cavity, according to which:
    a measurement procedure is defined, including an excitation step consisting of applying an electrical excitation signal to the cavity, a capture step consisting of taking off a measurement signal, said electrical excitation signal being chosen so that said measurement signal has a characteristic varying substantially with the quantity of product contained in the cavity and with a utilisation parameter for the product, and an identification step consisting of identifying a measured value of said characteristic of said measurement signal;
    a procedure is defined for determining an instantaneous value of the utilisation parameter;
    a processing procedure is defined, including a conversion step consisting of deriving the value of an item of information representing the quantity of product available in the reservoir from the measured value of the said characteristic as a function of the instantaneous value of the utilisation parameter; and
    at least one measurement cycle is effected, including steps consisting of:
        triggering the measurement procedure and capturing the measured value of the characteristic,
        triggering the determination procedure and capturing the instantaneous value of the utilisation parameter,
        triggering the conversion step from this measured value and this instantaneous value, and
        capturing the instantaneous value of the item of information.

2. Method according to claim 1, characterised in that the measurement procedure includes fitting the reservoir in a capacitive arrangement and the excitation step consists of applying the excitation signal to the capacitive arrangement.

3. Method according to claim 2, characterised in that the identification step consists of detecting the amplitude of the voltage of the measurement signal.

4. Method according to any one of claims 1 to 3, characterised in that:

the processing procedure also includes steps consisting of defining, for a principal reference value of the utilisation parameter, a table of correspondence between the value of the characteristic and the said information item representing the quantity of product available;

establishing, for at least one first ancillary reference value of the utilisation parameter, a correction law defining a compensation to be made to the measured value of the said characteristic in the case of use of this product with this ancillary reference value of the utilisation parameter; and the conversion step of this processing procedure includes steps consisting of:

comparing the instantaneous value of the utilisation parameter with the reference values;

deriving a processed value of the characteristic which, where this instantaneous value of the parameter is substantially equal to the principal reference value, is taken to be equal to the measured value of this characteristic or, where this instantaneous value of the parameter is substantially equal to the first ancillary reference value, is defined by applying to the measured value the said correction law corresponding to this ancillary reference value; and identifying the instantaneous value of the information given by the table of correspondence for this processed value of the characteristic.

5. Method according to claim 4, characterised in that the processing procedure also includes a step consisting of defining an interpolation law intended to define a correction law for any value of the utilisation parameter situated between two of the principal and ancillary reference values from correction laws corresponding to these two values, and the conversion step includes a step consisting of applying this interpolation law when the instantaneous value of the utilisation parameter lies between these two values.

6. Method according to any one of claims 1 to 3, characterised in that:

the processing procedure also includes steps consisting of defining, for a principal reference value of the utilisation parameter, a table of correspondence between the value of the characteristic and the said information item representing the quantity of product available;

establishing, for each of a plurality of ancillary reference values of the utilisation parameter, a correction law defining a compensation to be made to the measured value of the said characteristic in the case of use of this product with this ancillary reference value of the utilisation parameter; and the conversion step of this processing procedure includes steps consisting of:

comparing the instantaneous value of the utilisation parameter with the principal and ancillary reference values;

deriving a processed value of the characteristic which, where this instantaneous value of the parameter is substantially equal to the principal reference value, is taken to be equal to the measured value of this characteristic or, where this instantaneous value of the parameter is substantially equal to one of the ancillary reference values, is defined by applying to the measured value the said correction law corresponding to this ancillary reference value; and identifying the instantaneous value of the information given by the table of correspondence for this processed value of the characteristic.

7. Method according to any one of claims 1 to 3, characterised in that the procedure for determining the instantaneous value of the utilisation parameter includes a step consisting of capturing the value of a quantity representing a flow rate at which the product leaves the reservoir.

8. Method according to claim 7, characterised in that the product is a marking product and the reservoir is designed to be integrated into an image formation device adapted to form images, and the said step of the determination procedure consists of capturing a quantity representing the quantity of marking product which flows during the formation of an image.

9. Method according to claim 8, characterised in that the marking product is a printing ink, the reservoir is designed to be integrated into a printing device adapted to print pages, and the said step of the determinaton procedure consists of capturing a quantity representing the quantity of ink which flows during the printing of a page.

10. Method according to claim 8, characterised in that this representative quantity is the difference between the measured values of the characteristic before and after the formation of an image.

11. Method according to claim 7, characterised in that this quantity is the difference between the measured values of the characteristic corresponding to two distinct instants.

12. Method according to claim 7, charcterised in that the processing procedure includes steps consisting of establishing for each reference value a linear relationship between the value of the characteristic and the information item, the correction law associated with each ancillary reference value consisting of subtracting, from the measured value, a correction term proportional to the flow rate and to the difference in slopes between the linear relationships relating to the ancillary reference value and the principal reference value.

13. Device for monitoring the consumption of an electrically conductive product contained in a reservoir made of plastic and having a storage cavity connected to a product outlet channel, having:

first means for applying an electrical excitation signal to the cavity, and second means (122, 115) for taking off a measurement signal, said electrical excitation signal being chosen so that said measurement signal has a characteristic varying substantially with a quantity of product contained in the cavity and with a utilisation parameter for the product;

determination means for determining an instantaneous value of the utilisation parameter; and logic processing means connected to the first and second means and to the determination means and designed so as to:

control the first and second means and capture a measured value of the said characteristic of the measurement signal;

capture the instantaneous value of the utilisation parameter; and derive the value of an item of information representing the quantity of product available in the reservoir from the measured value of the said characteristic as a function of the instantaneous value of the utilisation parameter.

14. Device according to claim 13, characterised in that the first means include means adapted to constitute with the reservoir a capacitive arrangement connected to excitation means generating an excitation signal for the capacitive arrangement.

15. Device according to claim 14, characterised in that the determinaton means are designed so as to detect the amplitude of the voltage of the measurement signal.

16. Device according to any one of claims 13 to 15, characterised in that the logic processing means are designed so as to:
- store, for a principal reference value of the utilisation parameter, a table of correspondence between the value of the characteristic and the said information representing the quantity of product available;
- store, for at least a first ancillary reference value of the utilisation parameter, a correction law defining a compensation to be made to the measured value of the said characteristic in the case of use of this product with the ancillary reference value of the utilisation parameter;
- compare the instantaneous value of the utilisation parameter with the reference values;
- deduce a processed value of the characteristic which, where this instantaneous value of the parameter is substantially equal to the principal reference value, is taken to be equal to the measured value of this characteristic or, where this instantaneous value of the parameter is substantially equal to the first ancillary reference value, is defined by applying to the measured value the said correction law correspondng to the ancillary reference value; and
- identify the instantaneous value of the information given by the table of correspondence for this processed value of the characteristic.

17. Device according to claim 16, characterised in that the processing means are also designed so as to contain an interpolation law designed to define a correction law for any value of the utilisation parameter situated between two of the principal and ancillary reference values from correction laws corresponding to these values, and to apply this interpolation law when the instantaneous value of the utilisation parameter is between these two values.

18. Device according to any one of claims 13 to 15, characterised in that the logic processing means are designed so as to:
- store, for a principal reference value of the utilisation parameter, a table of correspondence between the value of the characteristic and the said information representing the quantity of product available;
- store, for each of a plurality of ancillary reference values of the utilisation parameter, a correction law defining a compensation to be made to the measured value of the said characteristic in the case of use of this product with the ancillary reference value of the utilisation parameter;
- compare the instantaneous value of the utilisation parameter with the principal and ancillary reference values;
- deduce a processed value of the characteristic which, where this instantaneous value of the parameter is substantially equal to the principal reference value, is taken to be equal to the measured value of this characteristic or, where this instantaneous value of the parameter is substantially equal to one of the ancillary reference values, is defined by applying to the measured value the correction law correspondng to the ancillary reference value; and
- identify the instantaneous value of the information given by the table of correspondence for this processed value of the characteristic.

19. Device according to any of claims 13 to 15, characterised in that the means of determining the instantaneous value of the utilisation parameter are designed so as to capture the value of a quantity representing a flow rate at which the product flows through the outlet channel out of the reservoir.

20. Device according to claim 19, characterised in that, the product being a marking product and the reservoir being designed to be integrated into an image formation device adapted to form images, the determination means are designed so as to capture a quantity representing the quantity of marking product which flows during the formation of an image.

21. Device according to claim 20, characterised in that, the marking product being a printing ink and the reservoir being designed to be integrated into a printing device adapted to print pages, the said determination means are designed so as to capture a quantity representing the quantity of ink which flows during the printing of a page.

22. Device according to claim 20, characterised in that these determination means are logic means designed so as to capture the difference between the measured values of the characteristic before and after the formation of an image.

23. Device according to claim 19, characterised in that these determination means are logic means designed so as to capture the difference between the measured values of the characteristic corresponding to two distinct instants.

24. Device according to claim 19, characterised in that the processing means are designed so as to establish, for each reference value, a linear relationship between the value of the characteristic and the information, the correction law associated with each ancillary reference value consisting of subtracting, from the measured value, a correction term proportional to a flow rate of the product and to a difference in slopes between the linear relationships relating to the ancillary reference value and the principal reference value.

25. Product supply device having a reservoir made of plastic having a storage cavity containing an electrically conductive product and an outlet channel, and a consumption monitoring device according to any one of claims 13 to 15.

26. Image formation device having reservoir made of plastic having a storage cavity containing an electrically conductive marking product and an outlet channel, and a consumption monitoring device according to any one of claims 13 to 15.

27. Printing device having an ink reservoir made of plastic having a storage cavity containing an electrically conductive ink and a device according to any one of claims 13 to 15.

28. Office machine having an electrically conductive ink reservoir and a consumption monitoring device according to any one of claims 13 to 15.

29. Logic processing unit, designed to cooperate with a reservoir made of plastic having a cavity storing an electrically conductive product connected to a product outlet channel, and with:
- first means for applying an electrical excitation signal to said cavity, and second means for taking off a measurement signal, the electrical excitation signal being chosen so that the measurement signal has a characteristic varying substantially with a quantity of product contained in the cavity and with a utilisation parameter for the product;
- means for determining an instantaneous value of this utilisation parameter; and,
- this processing unit being designed so as to:
  - control the first and second means and capture a measured value of the said characteristic of the measurement signal;
  - capture the instantaneous value of the utilisation parameter; and
  - derive the value of an item of information representing the quantity of product available in the reservoir from the measured value of the said characteristic as a function of the instantaneous value of the utilisation parameter.

30. Processing unit according to claim 29, characterised in that said unit is designed so as to:

store, for a principal reference value of the utilisation parameter, a table of correspondence between the value of the characteristic and the said information representing the quantity of product available;

store, for at least a first ancillary reference value of the utilisation parameter, a correction law defining a compensation to be made to the measured value of the said characteristic in the case of use of this product with this ancillary reference value of the utilisation parameter;

compare the instantaneous value of the utilisation parameter with the reference values;

deduce a processed value of the characteristic which, where this instantaneous value of the parameter is substantially equal to the principal reference value, is taken to be equal to the measured value of this characteristic or, where this instantaneous value of the parameter is substantially equal to the first ancillary reference value, is defined by applying to the measured value the said correction law correspondng to this ancillary reference value; and identify the instantaneous value of the information given by the table of correspondence for this processed value of the characteristic.

31. Processing unit according to claim 29, characterised in that said unit is designed so as to:

store, for a principal reference value of the utilisation parameter, a table of correspondence between the value of the characteristic and the said information representing the quantity of product available;

store, for each of a plurality of ancillary reference values of the utilisation parameter, a correction law defining a compensation to be made to the measured value of the said characteristic in the case of use of this product with this ancillary reference value of the utilisation parameter;

compare the instantaneous value of the utilisation parameter with the principal and ancillary reference values;

deduce a processed value of the characteristic which, where this instantaneous value of the parameter is substantially equal to the principal reference value, is taken to be equal to the measured value of this characteristic or, where this instantaneous value of the parameter is substantially equal to one of the ancillary reference values, is defined by applying to the measured value the correction law correspondng to this ancillary reference value; and identify the instantaneous value of the information given by the table of correspondence for this processed value of the characteristic.

32. Processing unit according to claim 30 or claim 31, characterised in that said unit is also designed so as to contain an interpolation law designed to define a correction law for any value of the utilisation parameter situated between two of the principal and ancillary reference values using correction laws corresponding to these two values, and to apply this interpolation law when the instantaneous value of the utilisation parameter is between these two values.

33. Processing unit according to any one of claims 29 to 31, characterised in that said unit includes the said means of determining the instantaneous value of the utilisation parameter and is designed so as to capture the value of a quantity representing a flow rate at which the product flows through the outlet channel out of the reservoir.

34. Processing unit according to claim 33, characterised in that, the product being a marking product and the reservoir being designed to be integrated into an image formation device adapted to form images, the determination means are designed so as to capture a quantity representing the quantity of marking product which flows during the formation of an image.

35. Processing unit according to claim 34, charcterised in that, the marking product being a printing ink and the reservoir being designed to be integrated into a printing device adapted to print pages, the said determination means are designed so as to capture a quantity representing the quantity of ink which flows during the printing of a page.

36. Processing unit according to claim 34, characterised in that said unit is designed so as to capture the difference between the measured values of the characteristic before and after the formation of an image.

37. Processing unit according to claim 33, characterised in that said unit is designed so as to capture the difference between the measured values of the characteristic corresponding to two distinct instants.

38. Processing unit according to any one of claims 30 or 31, characterised in that said unit is designed so as to establish, for each reference value, a linear relationship between the value of the characteristic and the information, the correction law associated with each ancillary reference value consisting of subtracting from the measured value a correction term proportional to a flow rate of the product and to a difference in slopes between the linear relationships relating to the ancillary reference value and the principal reference value.

* * * * *